(12) United States Patent
Park et al.

(10) Patent No.: US 8,195,470 B2
(45) Date of Patent: Jun. 5, 2012

(54) AUDIO DATA PACKET FORMAT AND DECODING METHOD THEREOF AND METHOD FOR CORRECTING MOBILE COMMUNICATION TERMINAL CODEC SETUP ERROR AND MOBILE COMMUNICATION TERMINAL PERFORMANCE SAME

(75) Inventors: Seongsoo Park, Seoul (KR); Seongkeun Kim, Seoul (KR); Sehyun Oh, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1053 days.

(21) Appl. No.: 12/092,069

(22) PCT Filed: Oct. 31, 2006

(86) PCT No.: PCT/KR2006/004487
§ 371 (c)(1),
(2), (4) Date: Apr. 29, 2008

(87) PCT Pub. No.: WO2007/066897
PCT Pub. Date: Jun. 14, 2007

(65) Prior Publication Data
US 2008/0228472 A1    Sep. 18, 2008

(30) Foreign Application Priority Data

Oct. 31, 2005  (KR) .................. 10-2005-0103033
Oct. 31, 2005  (KR) .................. 10-2005-0103482

(51) Int. Cl.
*G10L 19/00* (2006.01)
(52) U.S. Cl. .................. 704/500; 704/501; 704/504
(58) Field of Classification Search .......... 704/500–504, 704/227–230, 220–223, 200, 201
See application file for complete search history.

(56) References Cited

U.S. PATENT DOCUMENTS

| 5,987,418 A | 11/1999 | Gentit |
| 6,754,226 B1 | 6/2004 | Nakano |
| 2004/0128128 A1 | 7/2004 | Wang et al. |

FOREIGN PATENT DOCUMENTS

| EP | 1355471 | 10/2003 |
| EP | 1463334 | 9/2004 |

(Continued)

OTHER PUBLICATIONS

M. Wolters, K. Kjorling, D. Homm and H. Purnhagen, "A Closer Look into MPEG-4 High Efficient AAC," 115th AES Convention, Preprint 5871, Oct. 2003.*

(Continued)

*Primary Examiner* — Huyen X. Vo
(74) *Attorney, Agent, or Firm* — Lowe Hauptman Ham & Berner, LLP

(57) ABSTRACT

Disclosed is an audio data packet format for transmitting an MPEG-4 HE-AAC frame via a voice channel of a mobile communication network, a method for decoding the audio data packet format, a method for correcting a codec setup error by identifying a codec used to encode sound source data inserted into a data field of voice slot data, based on the sequence number of the voice slot data, and correcting the codec setup error when a codec set up in a mobile communication terminal is different from the codec used to encode the sound source data, and a mobile communication terminal adapted to correct a codec setup error.

10 Claims, 6 Drawing Sheets

FOREIGN PATENT DOCUMENTS

| | | |
|---|---|---|
| JP | 2006-323037 | 11/2006 |
| KR | 10-2005-0019346 | 3/2005 |
| TW | 200414153 | 10/2003 |
| WO | 2005/055193 | 6/2005 |
| WO | 2005/083703 | 9/2005 |
| WO | 2006/006801 | 1/2006 |
| WO | 2006/075269 | 7/2006 |
| WO | 2007/027003 | 3/2007 |

OTHER PUBLICATIONS

Sang-Uk Ryu et al.; "Effective High Frequency Regeneration Based On Sinusoidal Modeling For MPEG-4 HE-AAC"; 2005 IEEE Workshop on Application of Signal Processing to Audio and Acoustics; Oct. 16-19, 2005; pp. 211-214.

International Search Report for PCT/KR2006/004487.

Taiwanese Search Report for Taiwanese application No. 095140205, citing the attached references.

Japanese Office Action for 2008-538812 dated Jun. 30, 2011, citing the above reference(s).

Supplementary European Search Report for EP06812326, citing the above reference(s).

Sugano et al.; "Media Coding, Transmission, and Display"; Imaging & Visual Computing The Journal of the Institute of Image Electronics Engineers of Japan; Nov. 25, 2004; 11 pages.

* cited by examiner

AUDIO DATA PACKET FORMAT AND DECODING METHOD THEREOF AND METHOD FOR CORRECTING MOBILE COMMUNICATION TERMINAL CODEC SETUP ERROR AND MOBILE COMMUNICATION TERMINAL PERFORMANCE SAME

CROSS REFERENCE TO RELATED APPLICATION

This application claims the priority of Korean Patent Application No. 10-2005-0103033, filed on Oct. 31, 2005 and the priority of Korean Patent Application No. 10-2005-0103482, filed on Oct. 31, 2005 in the Korean Intellectual Property Office, the disclosure of which are incorporated herein in their entirety by reference. Further, this application is the National Phase application of International Application No. PCT/KR2006/004487, filed Oct. 31, 2006, which designates the United States and was published in English. This application, in its entirety, is incorporated herein by reference.

TECHNICAL FIELD

The present invention relates to an audio data packet format, a method for decoding the audio data packet format, a method for correcting a codec setup error, and a mobile communication terminal adapted to correct the codec setup error. More particularly, the present invention relates to an audio data packet format for transmitting an MPEG-4 HE-AAC (High Efficiency Advanced Audio Coding) frame via a voice channel of a mobile communication network and a method for decoding the same. In addition, the present invention relates to a method for correcting a codec setup error by identifying a codec used to encode sound source data inserted into a data field of voice slot data, based on the sequence number of the voice slot data, and correcting the codec setup error when a codec set up in a mobile communication terminal is different from the codec used to encode the sound source data, as well as a mobile communication terminal adapted to correct a codec setup error in the same method.

BACKGROUND ART

As generally known in the art, various services are provided via mobile communication networks in line with rapid development of technologies associated with computers, electronics, and communications. The most basic type of mobile communication service is a voice communication service, which enables users to communicate via mobile communication terminals regardless of time and place. In addition, a text message service complements the voice communication service. A wireless Internet service has recently been provided and enabled users of a mobile communication terminal to access the Internet via mobile communication networks.

As a result, subscribers to a mobile communication service can not only communicate with desired partners regardless of time and place, but also receive various types of daily information (e.g. news, weather, sports, stocks, exchange rate, traffic) in the form of texts, voices or images via wireless Internet access.

Due to the recent development of communication technology, mobile communication services are shifting from voice communication services to multimedia communication services for transmitting circuit data or packet data, for example.

Recently, the IS-95C network has evolved from conventional IS-95A and IS-95B networks and is capable of providing wireless Internet services at a data transmission rate of up to 307.2 Kbps, which is much faster than that supported by the conventional networks (14.1 Kbps and 56 Kbps). Particularly, IMT-2000 services can not only improve the quality of conventional voice communication and WAP services, but also provide various multimedia services (e.g. audio on demand, video on demand) at a higher rate.

Recently, ringback tone or color ringback tone services are drawing much attention. These services provide originators with various sound sources, which have been selected by recipients, as a ringback tone via a communication terminal. Particularly, conventional ringback tones, which are mechanical and monotonous, are replaced with various types of music or sound (e.g. popular music, sound of nature), which have been recorded by recipients. Upon hearing these novel ringback tones, originators get special impressions.

However, current ringback tone services have a problem in that outputted sound sources do not have excellent quality and, if a frame is lost while sound source data is transmitted for providing a ringback tone, mobile communication terminals cannot recognize the loss. This results in erroneous decoding.

DISCLOSURE OF THE INVENTION

Accordingly, the present invention has been made to solve the above-mentioned problems occurring in the prior art, and an object of the present invention is to provide an audio data packet format for transmitting audio data (e.g. ringback tone) via a voice channel by using an MPEG-4 HE-AAC audio codec frame so as to improve the quality of audio data.

Another object of the present invention is to provide a method for decoding an audio data packet quickly and accurately by adding a sequence number field when an MPEG-4 HE-AAC audio codec frame is transmitted after being divided into voice slot data.

Still another object of the present invention is to provide a method for correcting a codec setup error by identifying a codec used to encode sound source data inserted into a data field of voice slot data, based on the sequence number of the voice slot data, and correcting the codec setup error when a codec set up in a mobile communication terminal is different from the codec used to encode the sound source data, as well as a mobile communication terminal adapted to correct a codec setup error in the same method.

In order to accomplish this object, there is provided an audio data packet format comprising a first field for containing an audio data of a predetermined size to be transmitted, the audio data being fragmented from an audio frame; and a second field for specifying an order of divided audio data, wherein the audio frame is based on an MPEG-4 HE-AAC (High Efficiency Advanced Audio Coding) scheme.

In accordance with another aspect of the present invention, there is provided a method for decoding an audio data packet having a first field for containing an audio data of a predetermined size, the audio data being fragmented from an audio frame and a second field for specifying an order of divided audio data, the method including the steps of: (a) initializing a reference sequence number by using a decoder of a mobile communication terminal; (b) checking a second field of received audio data to confirm whether or not a first bit stream of the audio frame is transmitted; (c) decoding data preceding currently received data when a first bit stream of a new audio frame is transmitted; (d) storing the currently received data; (e) resetting the reference sequence number; and (f) returning to step (b).

In accordance with another aspect of the present invention, there is provided a method for correcting a codec setup error in a mobile communication terminal by analyzing voice slot data received from a mobile communication network while a multimedia audio codec is set up in the mobile communication terminal and identifying a codec used to encode sound source data inserted into a data field of the voice slot data to confirm whether or not the mobile communication terminal and the mobile communication network have an identical codec, the method comprising the steps of: (a) checking a sequence number inserted into the data field of every received voice slot data and determining that there is a codec setup error when the voice slot data is not received in order; and (b) replacing the multimedia audio codec with a voice codec, when it has been determined that there is a codec setup error.

In accordance with another aspect of the present invention, there is provided a method for correcting a codec setup error in a mobile communication terminal by analyzing voice slot data received from a mobile communication network while a voice codec is set up in the mobile communication terminal and identifying a codec used to encode sound source data inserted into a data field of the voice slot data so as to confirm whether or not the mobile communication terminal and the mobile communication network have an identical codec, the method comprising the steps of: (a) checking a sequence number SEQ inserted into the data field of every received voice slot data and determining that there is a codec setup error when the voice slot data is received in order; and (b) replacing the voice codec with a multimedia audio codec, when it is determined that there is a codec setup error.

In accordance with another aspect of the present invention, there is provided a mobile communication terminal for correcting a codec setup error by analyzing voice slot data received from a mobile communication network and identifying a codec used to encode sound source data inserted into a data field of the voice slot data to confirm whether or not the mobile communication terminal and the mobile communication network have an identical codec, the mobile communication terminal comprising: a voice codec for decoding and outputting voice data being inserted into the voice slot data and being transmitted during voice communication; a multimedia audio codec for decoding and outputting music data transmitted by a CRBT (Color Ring Back Tone) server providing a CRBT service, the music data being inserted into the voice slot data and being transmitted; and a codec control unit for performing a first function of driving the voice codec when a control message informing the start of voice communication is received from the mobile communication network, driving the multimedia audio codec when a control message informing the transmission of a ringback tone is received, checking a sequence number inserted into the data field of every received voice slot data when the voice slot data is received while the multimedia audio codec is in operation, determining that there is a codec setup error when the voice slot data is not received in order, restricting the operation of the multimedia audio codec, and letting the voice codec in operation, the codec control unit performing a second function of checking a sequence number inserted into the data field of every received voice slot data when the voice slot data is received while the voice codec is in operation, determining that there is a codec setup error when the voice slot data is received in order, restricting the operation of the voice codec, and driving the multimedia audio codec.

BRIEF DESCRIPTION OF THE DRAWINGS

The above and other objects, features and advantages of the present invention will be more apparent from the following detailed description taken in conjunction with the accompanying drawings, in which.

BEST MODE FOR CARRYING OUT THE INVENTION

Figure 1:
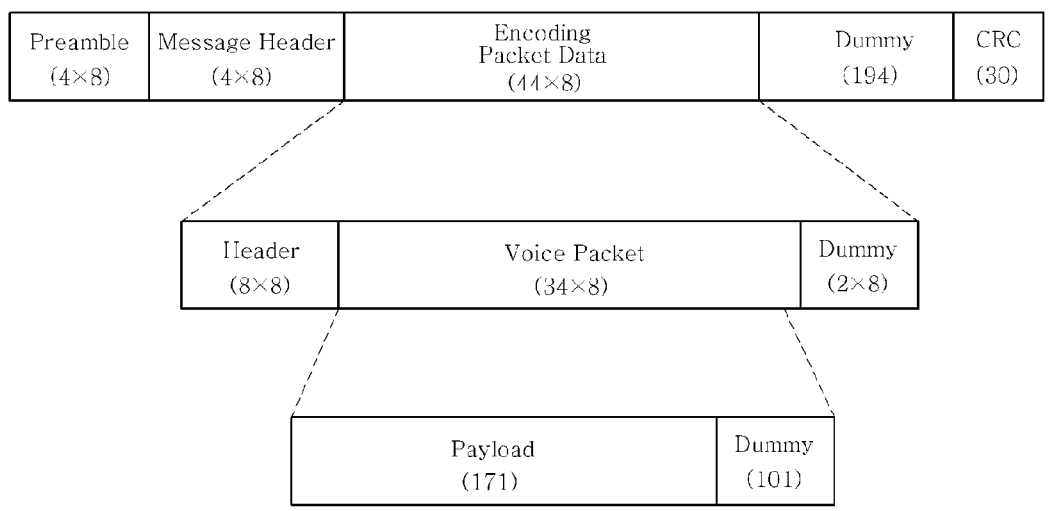
FIG. 1 shows a construction of a conventional EVRC data packet.

Hereinafter, a preferred embodiment of the present invention will be described with reference to the accompanying drawings. In the following description and drawings, the same reference numerals are used to designate the same or similar components, and so repetition of the description on the same or similar components will be omitted.

FIG. 1 shows a construction of a conventional EVRC data packet.

Most mobile communication terminals employ a voice codec with variable transmission rates, such as an EVRC (Enhanced Variable Rate Codec), in order to provide efficient voice communication via optimized wireless channels. The EVRC digitally converts voices used by digital mobile communication systems and has a transmission rate of 8 Kbps. The EVRC can efficiently keep sound quality from degrading. In addition, the EVRC variably encodes voice information depending on the amount of information. Particularly, the EVRC encodes voice at a low rate when there is a smaller volume of information (i.e. while the talker is silent) and at a high rate when there is a large amount of information. As such, the EVRC has a better voice encoding efficiency than when the encoding rate is constant. This expands the capacity of mobile communication systems and reduces the power consumption.

FIG. 1 shows the construction of a data packet used for the EVRC. Although an actual EVRC data packet includes two bypass frames of 80 bytes, only one frame is shown in FIG. 1 for clarity.

A bypass frame includes a preamble field of 32 bits, a message header field of 32 bits, an encoding packet data field of 352 bits, a dummy field of 194 bits, and a CRC (Cyclic Redundancy Check) field of 30 bits. The encoding packet data field includes a header field of 8 bytes, a voice packet field of 34 bytes, and a dummy field of 2 bytes.

The voice packet field includes a payload field of 171 bits and a dummy field of 101 bits so that compressed sound source data can be loaded on the payload field.

As such, the portion of an EVRC data packet occupied by actual data corresponds to 171 bits. According to the present invention, an HE-AAC frame for audio data transmission is included in that portion and transmitted, in order to improve the quality of audio data (e.g. ringback tone).

As used herein, AAC (Advanced Audio Coding) refers to a coding scheme for digital audio signals and has been declared an international standard based on MPEG of ISO/IEC. AAC frames have a variable size depending on the compression rate. This means that the entire file capacity can be reduced substantially. Compared with MP3 files, the file capacity of AAC frames can be reduced to 30%. In addition, the AAC scheme applies TNS (Temporal Noise Shaping) and prediction techniques so as to improve the sound quality. The TNS is one of quantization correction techniques and can intelligently reduce errors occurring when continuous analog data is converted into digital data of 0 and 1 so as to reduce noise and reproduce near original sound. The prediction technique stores numeric values corrected by the TNS. Particularly, previously corrected information is stored and used later when the same type of data appears. When a sound comes to have a different correction value during a quantization process, it may be regarded a different sound. The prediction technique avoids this. As such, the AAC has excellent sound quality over MP3.

Due to such excellent performance and high quality, the AAC has been adopted by MPEG-4, 3GPP, and 3GPP2 standards and is drawing much attention as a new type of audio codec for Internet, wireless, and digital broadcasting divisions. Furthermore, an MPEG4 HE-AAC (hereinafter, referred to as HE-AAC) has evolved from the AAC and is capable of providing sound quality of CD-grade even at a low transmission rate. It is expected that, if the HE-AAC codec is applied to a ringback tone service, for example, it can guarantee very high sound quality.

In order to apply the HE-AAC codec to a ringback tone service, for example, the data transmission rate necessary for real-time decoding should conform to the transmission rate of CDMA voice communication channels. In addition, HE-AAC frames should be divided into bit streams and transmitted according to the slit structure of the CDMA voice communication channels. Particularly, information of up to 171 bits should be transmitted for 20 ms in conformity with the transmission rate of 8 Kbps and the channel slot structure as required by the CDMA voice communication channels.

Figure 2:
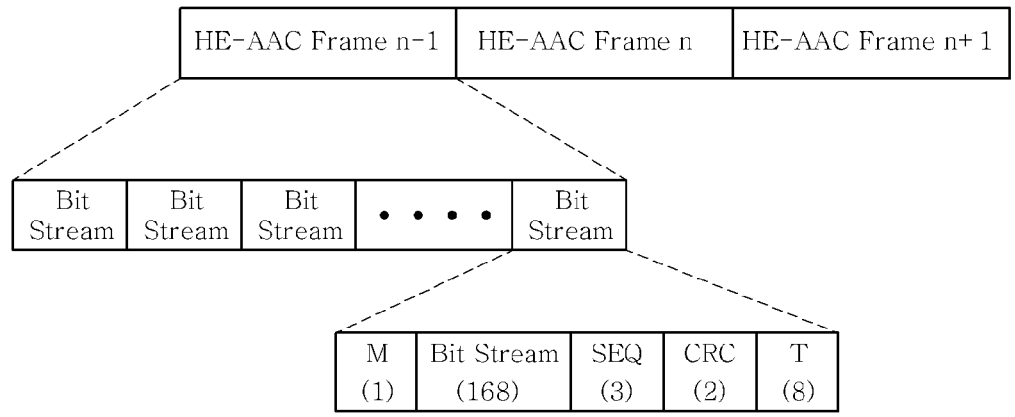
FIG. 2 shows the construction of an audio data packet format according to the present invention.

FIG. 2 shows the construction of an audio data packet format according to the present invention.

When an HE-AAC frame is to be transmitted in an EVRC data packet format used for CDMA voice communication channels, the frame should be included in a payload field as shown in FIG. 1. The HE-AAC frame has a variable length and is divided into such a size that it can be transmitted via a 20 ms slot. Then, the frame is transmitted as bit streams via a wireless link. After being transmitted to a mobile communication terminal, the HE-AAC bit streams are combined by the terminal and reconstructed as the HE-AAC frame.

During transmission of the HE-AAC bit streams, a base station controller adds multiplexing rate mode information (field M) of 1 bit, CRC information of 12 bits, and encoder tail information (field T) of 8 bits to each bit stream.

In order to efficiently map an HE-AAC frame onto a CDMA voice channel slot, it should be processed by byte. For this mapping, 168 bits (21 bytes) of a data field (171 bits) is used, and the remaining 3-bit data area remains as a free space, which may be used for another purpose. According to the present invention, the free space is used as a sequence number field SEQ.

It is impossible that a single CDMA voice slot includes an entire HE-AAC frame. Therefore, the HE-AAC frame should be divided into at least one bit stream and transmitted. During this process, two HE-AAC frames may appear consecutively within the same CDMA voice slot. The consecutive HE-AAC frames are differentiated from each other by a decoder of the mobile communication terminal, which searches for an ADTS (Audio Data Transport Stream) as an identifier for differentiating frames.

The ADTS header is basically included in the HE-AAC frame. The ADTS header includes a Syncword field of 12 bits; an ID field of 1 bit; a Layer field of 2 bits; a Protection_Absent field of 1 bit; a Profile_ObjectType field of 2 bits; a Private_bit field of 1 bit; a Sampling_Frequency_Index field of 4 bits; a Channel_Configuration field of 3 bits; a Home field of 1 bits; and an Original/Copy field of 1 bit.

The decoder of the mobile communication terminal has no information on which part of received data the ADTS header is located. Therefore, the decoder checks the frame differentiation identifier of every received data. This increases the processing load. Even when the wireless channel environments get worse and a transmission packet is lost, the modem of the mobile communication terminal does not transmit error data to the decoder, which is still unaware of the loss. As a result, the length or content of the frame may be varied during an HE-AAC decoding process.

Therefore, in order to correct the decoding error resulting from the wireless channel error, to differentiate the HE-AAC frames efficiently, and to specify the order of a plurality of bit streams, into which a single HE-AAC frame has been divided, 3 bits (free bits) of the payload (171 bits) are designated as a sequence number field SEQ. This solves the problems of increased load due to frame differentiation, as well as the decoding error.

For example, the sequence number field SEQ may contain binary digits from '000' to '111'. Information of '000' is inserted into a slot, which contains a newly beginning HE-AAC frame. The next voice slot of the same HE-AAC frame is given a value increased by 1. When the next HE-AAC frame is inserted into the voice slot, it is designated as '000' again.

Based on the sequence number, the decoder of the mobile communication terminal can easily determine whether or not a voice slot, which includes an HE-AAC frame, has a loss and easily obtain information regarding the beginning of the next HE-AAC, i.e. which part of the voice slot data includes the ADTS header. Since the location of the SEQ field is fixed, the decoder searches received data and, if the SEQ field has been designated as '000', determines that the ADTS header is at the front end of the corresponding bit stream.

In summary, the present invention employs an EVRC format so as to transmit audio data packets. The first field of the entire area designated as the payload field is used to transmit data, and the second field is used to transmit the sequence number. Upon receiving an audio data packet, the mobile communication terminal can easily determine whether or not the HE-AAC frame has a loss, clearly differentiate frames from each other, and quickly reconstruct the HE-AAC frame. For example, 168 bits are allocated to the first field, and 3 bits to the second field.

Figure 3:
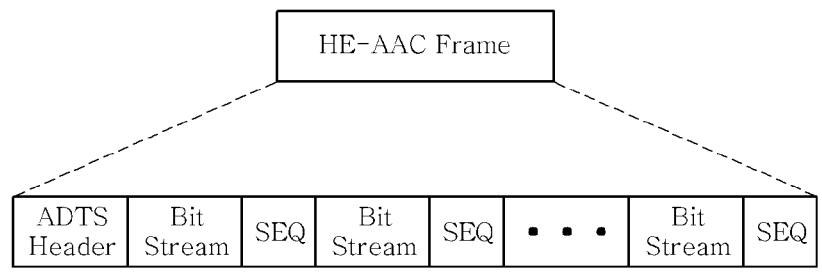
FIG. 3 shows an example of an audio data packet format including a frame boundary section identifier.

FIG. 3 shows an example of an audio data packet format including a frame boundary section identifier.

The ADTS header, which is an identifier for differentiating HE-AAC frames, is located at the front end of the first bit stream, i.e. bit stream having a SEQ field designated as '000.' As such, the SEQ field is used to differentiate frames so that, if a slot including an ADTS header is lost, that slot can be located by simply checking the sequence number field without having to search the data stream within all voice slots following the lost slot.

Figure 4:
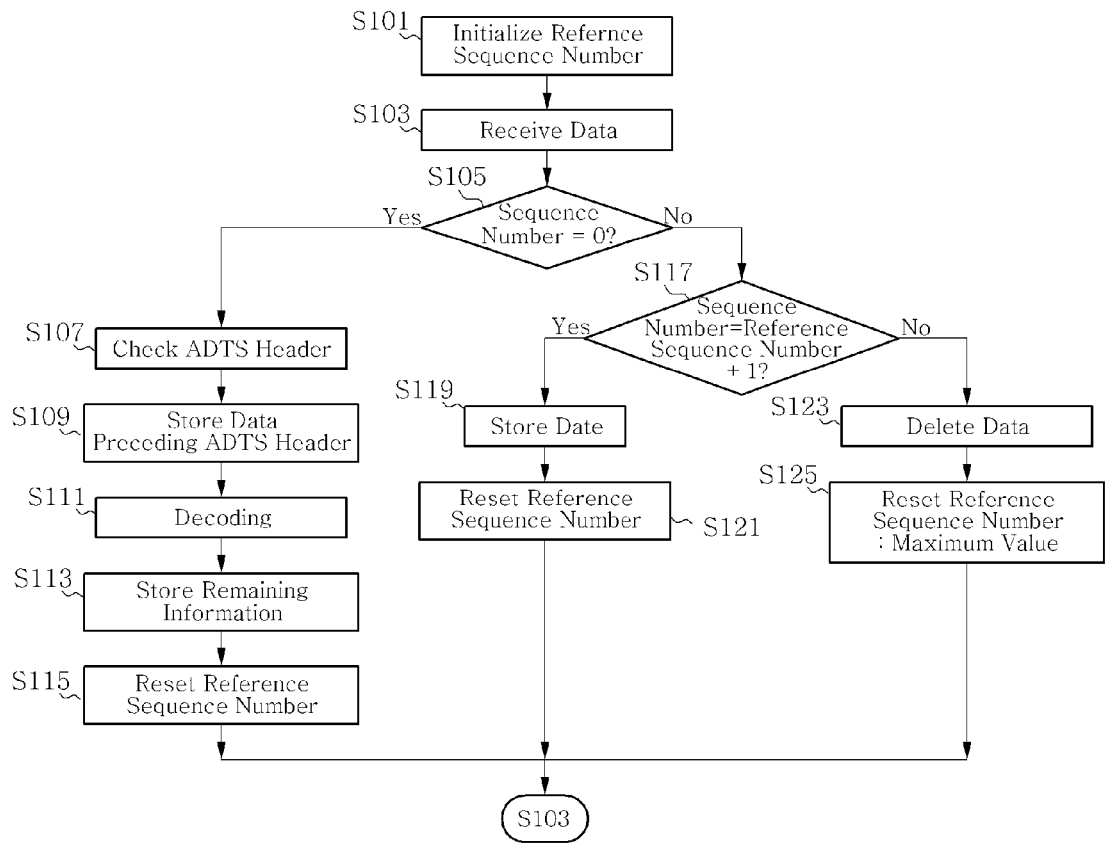
FIG. 4 is a flowchart showing a method for decoding an audio data packet according to the present invention.

FIG. 4 is a flowchart showing a method for decoding an audio data packet according to the present invention.

The decoder of a mobile communication terminal initializes a reference sequence number value for differentiating frames or specifying the order of bit streams (S101).

Upon receiving audio data from a mobile communication network (S103), the decoder checks the sequence number field SEQ of the received data and confirms whether or not the sequence number is 0 or 000 (binary digit), which means that a new frame has been received (S105).

If it has been confirmed that the sequence number is 0, the decoder checks the ADTS header (S107) and stores all data preceding the ADTS header information in the buffer (S109). Then, the decoder performs decoding by coupling voice data stored in the buffer (S111).

The decoder stores remaining information, including the ADTS header, in the buffer (S113) and resets the reference sequence number so that, when the next HE-AAC frame is received, its sequence number can be compared with the reference sequence number (S115). In this case, the reference sequence number is modified into the sequence number included in the currently received data.

After resetting the reference sequence number, the decoder stands by until the next data is received (S103). Then, the subsequent steps are repeated.

If is has been confirmed in step S105 that the sequence number of the received data is not 0, the decoder checks whether or not the sequence number of the currently received bit stream is equal to the reference sequence number plus 1 (S117). In that case, i.e. if it has been confirmed that the currently received bit stream belongs to the same frame as the previously received bit stream and directly succeeds it, the decoder stores the received data (S119). The decoder modifies the reference sequence number into the sequence number of the currently received bit stream (S121) and returns to step S103.

If it has been confirmed in step S117 that the sequence number of the currently received bit stream is not equal to the reference sequence number plus 1, the decoder determines that an error has occurred in data transmission and deletes the received data (S123). Then, the decoder resets the reference sequence number (S125). Particularly, the reference sequence number is modified into the highest value that the sequence number field can indicate so that, since an error has occurred, decoding does not begin until a new HE-AAC frame is received.

Although not shown in the drawings, according to a preferred embodiment of the present invention, it is also possible to receive data, compare its sequence number with the reference sequence number, and notify the exchanger of a missing sequence number, if any, so that the lost data can be retransmitted.

The above-mentioned method is advantageous in that it is possible to prevent the length or content of frames from varying during a decoding process due to the loss of HE-AAC frames. In addition, the amount of processing required of the mobile communication terminal can be reduced by locating a CDMA voice slot including ADTS header information.

However, application of the method to a ringback tone service may cause the following problems.

When a ringback tone service is provided, a multimedia audio codec (e.g. HE-AAC) is used in a ringback tone section, and a voice codec (e.g. EVRC) is used in a speech section. If the codec setup of the mobile communication terminal is different from that of the system, the service cannot be successful however efficient this scheme may be.

Therefore, a method for correcting a codec setup error in a mobile communication terminal using a sequence number field will now be described.

Figure 5:
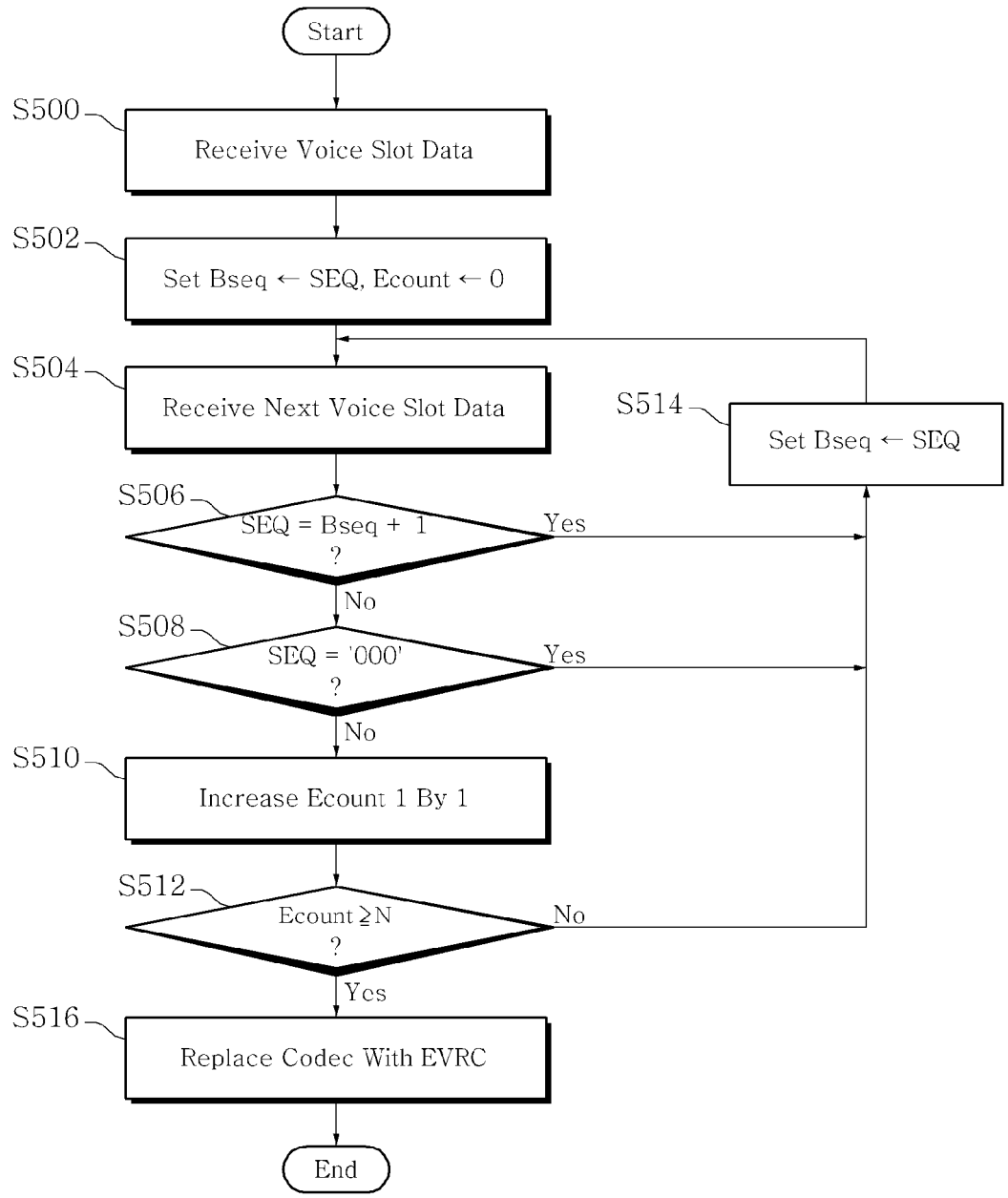
FIG. 5 is a flowchart showing a method for correcting an codec setup error in a mobile communication terminal providing a ringback tone service according to a preferred embodiment of the present invention, wherein, when an HE-AAC codec has been set up in the mobile communication terminal, a sequence number field is used to check whether or not the mobile communication system and the mobile communication terminal have the same codec.

FIG. 5 is a flowchart showing a method for correcting an codec setup error in a mobile communication terminal providing a ringback tone service according to a preferred embodiment of the present invention, wherein, when an HE-AAC codec has been set up in the mobile communication terminal, a sequence number field is used to check whether or not the mobile communication system and the mobile communication terminal have the same codec.

As mentioned with reference to FIGS. 2 and 3, when data distributed within and mapped onto a CDMA voice slot is an HE-AAC frame encoded by an HE-AAC codec, each CDMA voice slot data transmitted from the mobile communication network to the mobile communication terminal has a sequence number assigned thereto in an order.

Therefore, the mobile communication terminal searches for the sequence number field of the CDMA voice slot data and, if the CDMA voice slot data has not been received in the right order, determines that an error has occurred in the setup of the codec, which is then replaced with a voice codec (i.e. EVRC codec).

More particularly, upon receiving CDMA voice slot data from the base station (S500), the mobile communication terminal designates the sequence number SEQ of a sequence number field, which has been inserted into a data field of the received CDMA voice slot data, as a reference sequence number Bseq and initializes a codec counter Ecount (S502).

Upon receiving the next CDMA voice slot data (S504), the terminal determines whether or not the sequence number SEQ of the received CDMA voice slot data is larger than the reference sequence number Bseq by 1 (S506). If not, the terminal determines whether or not the sequence number SEQ is '000' (S508).

If the sequence number SEQ is not '000', the terminal increases the codec counter by 1 (S510) and determines whether or not the codec counter is equal to or larger than a predetermined number N (S512).

If it has been determined that the codec counter is equal to or larger than the predetermined number N, the terminal confirms that there is a codec setup error. Then, the terminal replaces the currently set HE-AAC codec with a voice codec, i.e. EVRC codec (S516).

If it has been determined in step S506 that the sequence number SEQ is larger than the reference sequence number Bseq by 1, if it has been determined in step S508 that the sequence number SEQ is '000', or if it has been determined in step S512 that the codec counter is smaller than the predetermined number N, the terminal designates the received sequence number SEQ as the reference sequence number Bseq (S514) and proceeds to step S504.

The predetermined number N is selected so as to differentiate a codec setup error from a loss of CDMA voice slot data, and is preferably equal to or larger than 2.

Figure 6:
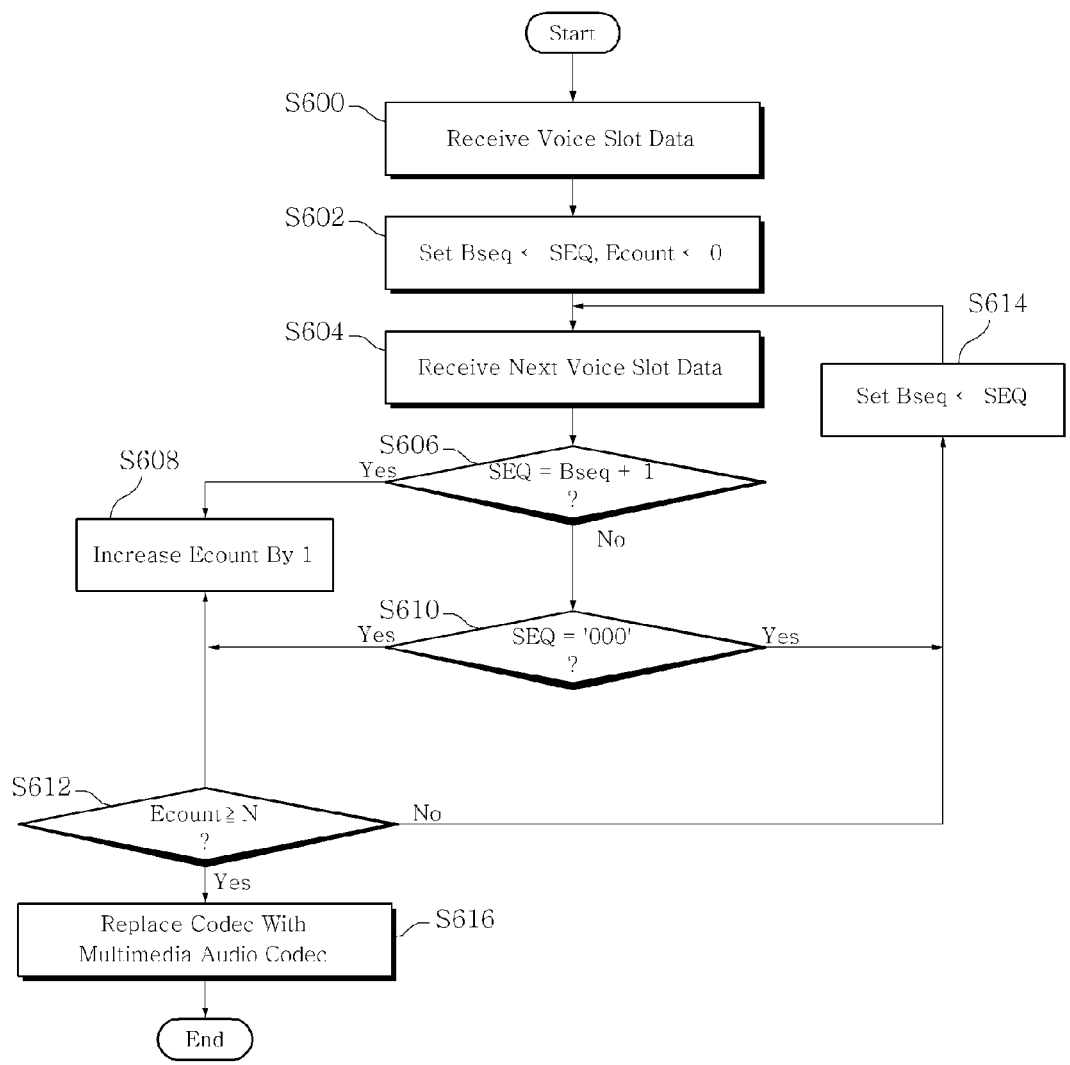
FIG. 6 is a flowchart showing a method for correcting an codec setup error in a mobile communication terminal providing a ringback tone service according to a preferred embodiment of the present invention, wherein, when an EVRC has been set up in the mobile communication terminal, a sequence number field is used to check whether or not the mobile communication system and the mobile communication terminal have the same codec.

FIG. 6 is a flowchart showing a method for correcting an codec setup error in a mobile communication terminal providing a ringback tone service according to a preferred embodiment of the present invention, wherein, when an EVRC has been set up in the mobile communication terminal, a sequence number field is used to check whether or not the mobile communication system and the mobile communication terminal have the same codec.

Upon receiving CDMA voice slot data at least a predetermined number of times in an order, the mobile communication terminal confirms that the codec of the mobile communication system is an HE-AAC codec and replaces the currently set EVRC codec with the HE-AAC codec.

More particularly, upon receiving CDMA voice slot data from the base station (S600), the mobile communication terminal designates the sequence number SEQ of a sequence number field, which has been inserted into a data field of the received CDMA voice slot data, as a reference sequence number Bseq and initializes a codec counter Ecount (S602).

Upon receiving the next CDMA voice slot data (S604), the terminal determines whether or not the sequence number SEQ of the received CDMA voice slot data is larger than the reference sequence number Bseq by 1 (S606). If so, the terminal increases the codec counter Ecount by 1 (S608) and determines whether or not the codec counter Ecount is equal to or larger than a predetermined number N (S612).

If it has been determined in step S606 that the sequence number SEQ is not larger than the reference sequence number Bseq by 1, the terminal determines whether or not the sequence number SEQ is '000' (S610) and, if so, proceeds to step S612.

If it has been determined in step S610 that the sequence number SEQ is not '000', or if it has been determined in step 612 that the codec counter Ecount is smaller than the predetermined number N, the terminal designates the received sequence number SEQ as the reference counter and proceeds to step S604 (S614).

If it has been determined in step S612 that the codec counter Ecounter is equal to or larger than the predetermined number N, the terminal confirms that the codec of the mobile communication system is an HE-ACC codec and replaces the EVRC voice codec, which has been currently set up in the mobile communication terminal, with the HE-AAC codec (S616).

Figure 7:
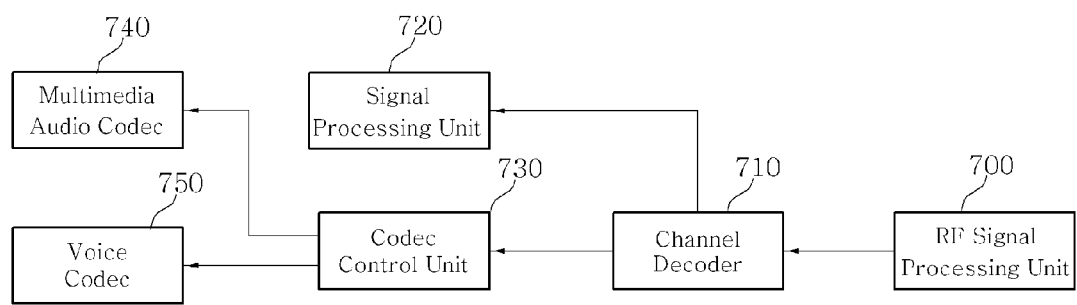
FIG. 7 briefly shows the construction of a mobile communication terminal adapted to correct a codec setup error while providing a ringback tone service according to a preferred embodiment of the present invention.

FIG. 7 briefly shows the construction of a mobile communication terminal adapted to correct a codec setup error while providing a ringback tone service according to a preferred embodiment of the present invention.

The mobile communication terminal adapted to correct a codec setup error while providing a ringback tone service according to a preferred embodiment of the present invention includes an RF signal processing unit 700, a channel decoder 710, a signal processing unit 720, a codec control unit 730, a voice codec 740, and a multimedia audio codec 750.

The RF signal processing unit 700 is adapted to convert wireless signals, which have been received via an antenna, into digital signals. The channel decoder 710 is adapted to decode digital signals, which have been received from the RF signal processing unit 700, so that they are divided into signal and data portions. The signal portion is transmitted to the signal processing unit, and the data portion to the codec control unit 730.

Upon receiving a control message (alerting info message) informing that voice communication begins from the mobile communication network, the codec control unit 730 drives the voice codec 750. Upon receiving a control message informing that a ringback tone is transmitted (data burst message informing of setup of a multimedia audio codec), the codec control unit 730 drives the multimedia audio codec 740.

Particularly, if the codec control unit 730 receives voice slot data while the multimedia audio codec 740 is driven, it checks the sequence number inserted into the data field of every received voice slot data. If the voice slot data has not been received in the right order, the codec control unit 730 determines that there is a codec setup error. Then, the codec control unit 730 limits the driving of the audio codec 740 and drives the voice codec 750 (first function) in the same method as described with reference to FIG. 4.

If the codec control unit 730 receives voice slot data while the voice codec 750 is driven, it checks the sequence number inserted into the data field of every received voice slot data. If the voice slot data has been received in the right order, the codec control unit 730 determines that there is a codec setup error. Then, the codec control unit 730 limits the driving of the voice codec 750 and drives the multimedia audio codec 740 (second function) in the same manner as described with reference to FIG. 5.

The voice codec 740 is adapted to decode voice data, which is transmitted while being inserted into voice slot data during voice transmission. An EVRC codec is preferably used as the voice codec 740.

The multimedia audio codec 750 is adapted to decode music data transmitted by a CRBT server, which provides a CRBT service. Although any type of audio codec may be used as the multimedia audio codec 750, an HE-AAC codec is preferably used.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

As mentioned above, the present invention is advantageous in that, by using an HE-AAC mode for an audio service (e.g. ringback tone, color ringback tone), the quality of audio signals is improved remarkably. In addition, the use of an EVRC data format and the application of a sequence number field when an HE-AAC frame is transmitted reduce the time necessary to decode the HE-AAC frame. Furthermore, even when data has been lost, it can be spotted quickly. This reduces the service time and increases the rate.

The improved boundary search for differentiation between HE-AAC frames and the higher stability of the decoder guarantee an efficient ringback tone service.

In addition, even when the codec used by the mobile communication network differs from that used by the mobile communication terminal due to an error occurring while a call is processed in the case of a ringback tone service using a multimedia audio codec for a ringback tone section and a voice codec for a voice communication section, the mobile communication terminal can make a proper decision by itself and modify the codec setup so that the ringback tone service can be provided without interruption.

The invention claimed is:

1. A method of generating an audio data packet by a mobile communication terminal, the method comprises the steps of:
   mapping an audio data of a predetermined size to be transmitted onto a first field using the mobile communication terminal, the audio data being fragmented from an audio frame; and
   mapping an order of divided audio data onto a second field, wherein the audio frame is based on an MPEG-4 HE-AAC (High Efficiency Advanced Audio Coding) scheme.

2. The method as claimed in claim 1, wherein the audio frame is contained in a payload field of an EVRC (Enhanced Variable Rate Codec) data packet.

3. The method as claimed in claim 1, wherein the audio frame is divided by byte and transmitted via the first field.

4. The method as claimed in claim 1, wherein the first field includes an ADTS (Audio Data Transport Stream) header when a value allocated to the second field indicates a first divided data of the audio frame.

5. A method for decoding an audio data packet performed by a mobile communication terminal having a first field for containing an audio data of a predetermined size, the audio data being fragmented from an audio frame and a second field for specifying an order of divided audio data, the method comprising the steps of:
   (a) initializing a reference sequence number by using a decoder of a mobile communication terminal;
   (b) checking a second field of received audio data to confirm whether or not a first bit stream of the audio frame is transmitted;
   (c) decoding data preceding currently received data when a first bit stream of a new audio frame is transmitted;
   (d) storing the currently received data;
   (e) resetting the reference sequence number; and
   (f) returning to step (b).

6. The method as claimed in claim 5, wherein, in step (e), the reference sequence number is modified into a value set up in a second field of the currently received data.

7. The method as claimed in claim 5, further comprising the steps of:
   (g) confirming whether or not a currently received bit stream is transmitted next to a previously received bit stream when it is confirmed in step (b) that a bit stream of currently received audio data is not a first bit stream of an audio frame;
   (h) storing the received data when the currently received bit stream is transmitted next to the previously received bit stream;
   (i) resetting the reference sequence number; and
   (j) returning to step (b).

8. The method as claimed in claim 7, wherein, in step (i), the reference sequence number is modified into a value set in a second field of the currently received data.

9. The method as claimed in claim 7, further comprising the steps of:
   (k) deleting the received data when it is confirmed in step (g) that the currently received bit stream is not transmitted next to the previously received bit stream; and
   (l) resetting the reference sequence number and returning to step (b).

10. The method as claimed in claim 9, wherein, in step (l), the reference sequence number is modified into a maximum value being able to be set in a second field.

* * * * *